United States Patent
Schoeggl

(10) Patent No.: US 7,680,639 B2
(45) Date of Patent: Mar. 16, 2010

(54) METHOD FOR SIMULATING THE DRIVING BEHAVIOR OF VEHICLES

(75) Inventor: Peter Schoeggl, Seiersberg (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 11/727,769

(22) Filed: Mar. 28, 2007

(65) Prior Publication Data

US 2007/0179696 A1    Aug. 2, 2007

Related U.S. Application Data

(63) Continuation of application No. 10/619,546, filed on Jul. 16, 2003, now abandoned.

(30) Foreign Application Priority Data

Jul. 19, 2002    (AT)    ............... A 1104/2002

(51) Int. Cl.
G06G 7/48    (2006.01)
G09B 9/04    (2006.01)
(52) U.S. Cl. ............................ 703/8; 434/66
(58) Field of Classification Search ............... 703/8; 434/55–69
See application file for complete search history.

(56) References Cited

U.S. PATENT DOCUMENTS

| 4,939,985 | A  | * | 7/1990  | Von Thun ................. 73/118.1 |
| 5,547,382 | A  | * | 8/1996  | Yamasaki et al. ............. 434/61 |
| 5,986,545 | A  | * | 11/1999 | Sanada et al. ............... 340/439 |
| 6,079,258 | A  | * | 6/2000  | List et al. ................. 73/118.01 |
| 6,754,615 | B1 | * | 6/2004  | Germann et al. .............. 703/8 |
| 2002/0029136 | A1 | * | 3/2002 | Hagiwara et al. ............. 703/8 |
| 2003/0014230 | A1 | * | 1/2003 | Hagelin ...................... 703/8 |
| 2003/0191573 | A1 | * | 10/2003 | Beyer et al. ................ 701/70 |
| 2004/0104618 | A1 | * | 6/2004 | Yamamoto et al. ........... 303/20 |

* cited by examiner

Primary Examiner—Paul L Rodriguez
Assistant Examiner—Andre Pierre Louis
(74) Attorney, Agent, or Firm—Dykema Gossett PLLC

(57) ABSTRACT

The invention relates to a method for simulating the driving behavior of vehicles on a test stand in which the engine of the vehicle is coupled on the test stand to an electronically controllable braking apparatus and a simulation model calculates simulation values of variables which are representative of the driving state of the vehicle in that the reaction of the vehicle to the behavior of the engine and the values of the variables as determined immediately prior thereto are calculated, with at least the vehicle speed and the slip occurring in the driving wheels being calculated as variables. An improved calculation can be achieved in such a way that for controlling the braking apparatus a virtual vehicle speed is used which is changed by a corrective value which depends on the slip.

4 Claims, 1 Drawing Sheet

METHOD FOR SIMULATING THE DRIVING BEHAVIOR OF VEHICLES

CROSS-REFERENCE TO RELATED APPLICATION

This application is a continuation of application Ser. No. 10/619,546, filed Jul. 16, 2003.

BACKGROUND OF THE INVENTION

1. Field of the Invention

The invention relates to a method for simulating the driving behavior of vehicles on a test stand in which the engine of the vehicle is coupled on the test stand to an electronically controllable braking apparatus and a simulation model calculates simulation values of variables which are representative of the driving state of the vehicle in that the reaction of the vehicle to the behavior of the engine and the values of the variables as determined immediately prior thereto are calculated, with at least the vehicle speed and the slip occurring in the driving wheels being calculated as variables.

2. The Prior Art

The behavior of the motor vehicles can be simulated on test stands. Usually, an internal combustion engine which is identical to the internal combustion engine disposed in the vehicle is coupled with an electric braking apparatus on a dynamic test stand. On the basis of various simulation models which are described below, a braking torque is determined which is set on the electric brake and burdens the internal combustion engine accordingly. From a systematic viewpoint one can distinguish between the following simulation models:

- The drive train model $MOD_D$ which reflects the masses, elasticities and dampings of the drive train as well as the speed increasing ratio of the change speed gear.
- In a vehicle model $MOD_V$ substantially the air resistance and the rolling resistance of the vehicle depending on the vehicle speed and the slip occurring in the drive wheels is taken into account. Moreover, the mass of the vehicle is reflected.
- In a wheel model $MOD_W$ the occurring slip is determined depending on the vehicle speed and the moment applied to the driving wheels.

The partial models as described above can naturally be parts of an integrated overall model. In the description below the individual partial models will be discussed separately for the purpose of better clarity.

It is known to operate a test stand according to a simplified model where the slip is neglected. It is understood that effects which depend substantially on the slip cannot be reflected by such a model. In order to minimize errors resulting therefrom, a slight change of the air resistance or the rolling resistance of the vehicle is usually made in the model in order to ensure that the behaviour of the vehicle simulated on the test stand corresponds to the highest possible extent to the real vehicle.

According to an extended model according to the state of the art, the calculated slip for determining the vehicle speed is used in a calculatory correct manner. As a result, in stationary or close to stationary vehicle states it is possible to achieve a very favorable representation of the vehicle on the test stand. In connection with slip control systems the disadvantages as explained above occur, which are that the oscillations caused by the slip control cannot be reflected adequately.

The engine control of the vehicle can be provided in many different ways. In a first variant (a drive-determined system) the engine control is performed primarily by the driver, i.e. the driver influences the position of the throttle valve or any other relevant parameter in a substantially direct fashion. The motor vehicle system thus represents an open control system, i.e. the vehicle behavior acts back on the engine merely via the speed on the crankshaft. No other reactions are provided.

In another operating mode the engine control is not only influenced by the driver's intentions as expressed in the gas pedal position, but also by variables which depend on the behavior of the vehicle per se. Examples for such engine controls are cruise controls and slip control systems. In a slip control system the slip present in the driving wheels is determined from the speed difference of the driven wheels from the non-driven wheels. Interventions are made in the engine control depending on the slip. This can occur by a change of the throttle valve position, a change of the injected fuel quantity, the injection time or temporary cylinder cut-out. In this way it is possible in racing sports to keep the slip within an optimal region which ensures a maximum propulsive thrust or an optimal lateral guiding force of the driving wheels in curves.

The characteristic aspect in using slip control programs is that oscillations occur in the drive train when the slip control responds, which oscillations are caused by the control algorithms of the slip control program. These oscillations have a frequency of 20 Hertz for example.

It has now been seen that even in highly dynamic test stands and when using correct models for the drive train, the vehicle and the wheels, it is not possible to represent these oscillations in a manner which corresponds to the behavior of the real vehicle. The reason for this is the fact that the moment of inertia of the electric braking apparatus on the test stand is substantially higher than the moment of inertia of the of the driving wheels and the drive train. In a test stand for racing engines the moment of inertia of the electric braking apparatus is typically within a magnitude which is a multiple of the moment of inertia of a driving wheel. Due to this higher inertia on the test stand, the oscillations which are caused by slip control cannot be represented accordingly and it is thus not possible to obtain a realistic picture of the behavior of the vehicle in this operating state.

Even in the simulation of vehicles which are produced in series and in which a slip control generally only intervenes in exceptional driving situations, effects occur frequently which cannot be represented or can only be represented inadequately in a simulation performed in a conventional manner such as impacts in the drive train and the like.

On the basis of the mechanical loads on the test stand it is also not possible without special measures to reduce the moment of inertia of the electric brake to such an extent that a correspondence with the real vehicle can be produced.

SUMMARY OF THE INVENTION

It is the object of the present invention to avoid such disadvantages and to provide a method and an apparatus with which the behavior of a vehicle can be simulated also in the presence of a slip control or a similar program, which simulation corresponds to reality to a substantial extent.

It is provided for in accordance with the invention that for controlling the braking apparatus a virtual vehicle speed is used which is changed by a corrective value which depends on the slip.

The slip is designated as the ratio of the speed difference of the wheel circumference to the vehicle speed $v_V$ and the speed $v_W$ of the wheel circumference according to formula (1).

$$S = (v_W - v_V)/v_W \qquad (1)$$

The speed $v_W$ of the wheel circumference is obtained according to formula (2) from the product of the wheel circumference $v_W$ and the rotational speed $U_W$ of the wheel.

$$v_W = n_W \cdot U_W \qquad (2)$$

A virtual vehicle speed is determined from the vehicle speed which is calculated according to the conventional model, such that the same is corrected by a factor k which is a function of slip.

The slip can be determined in this process from the difference of the speed of the driven wheels to the non-driven wheels or from the difference of the engine speed which is multiplied with the respective transmission ratios in the drive strand to the speed of the non-driven wheels. The above wheel speeds are naturally calculatory values which are obtained from the simulation model.

The relevant aspect is that the electronic system of the engine is supplied with data which correctly represents the slip occurring in reality. It is especially necessary that the higher-frequency parts of the fluctuations of the slip which are caused by the slip control programs are represented. The speed signal can be corrected or uncorrected, depending on the manner in which the other data such as the vehicle speed are entered.

Since the slip causes phenomena by the higher-frequency shares which cannot be represented on a test stand with conventional means, it is provided for in a preferred embodiment of the invention that the corrective value depends primarily on short-term fluctuations of the slip.

In a variant of the invention it is advantageously possible that a slip is represented by acceleration through a positive corrective value and a slip is represented by retarding or blocking the driven wheels through a negative corrective value. It is further favorable when the lateral slip is considered or corrected by a further simulation model. In this way it is possible to reflect oversteering or understeering of the vehicle appropriately.

A further increase in the precision can be achieved when inclinations in the vehicle chassis are taken into account. The changes in the contact surface forces caused by yawing or pitching are thus included appropriately in the calculation models.

Slip control programs usually calculate the slip from a speed difference between the front wheels and the rear wheels of a vehicle, with a correction being performed on the basis of the steering angle in order to take the different running path into account. In racing, however, the slip is often calculated from the speed of the non-driven wheels which is compared with a fictitious speed which is determined from the engine speed and the transmission ratios in the drive train. It is possible in this way to realize slip limitation programs which show a quicker response behavior. In such slip limitation programs it is advantageous when the speed of non-driven wheels of the vehicle as calculated by the simulation model is changed by a further corrective value which depends on the slip. As a result, a correct function of the slip limitation programs can also be secured on the test stand.

It is further possible that the speed calculated by the simulation model or also the slip as calculated by the simulation model is used for electronic vehicle control or electronic engine control (ECU).

BRIEF DESCRIPTION OF THE DRAWINGS

The invention is now explained in closer detail by reference to the embodiments shown in the drawings, wherein.

DETAILED DESCRIPTION OF THE PREFERRED EMBODIMENTS

Figure 1:
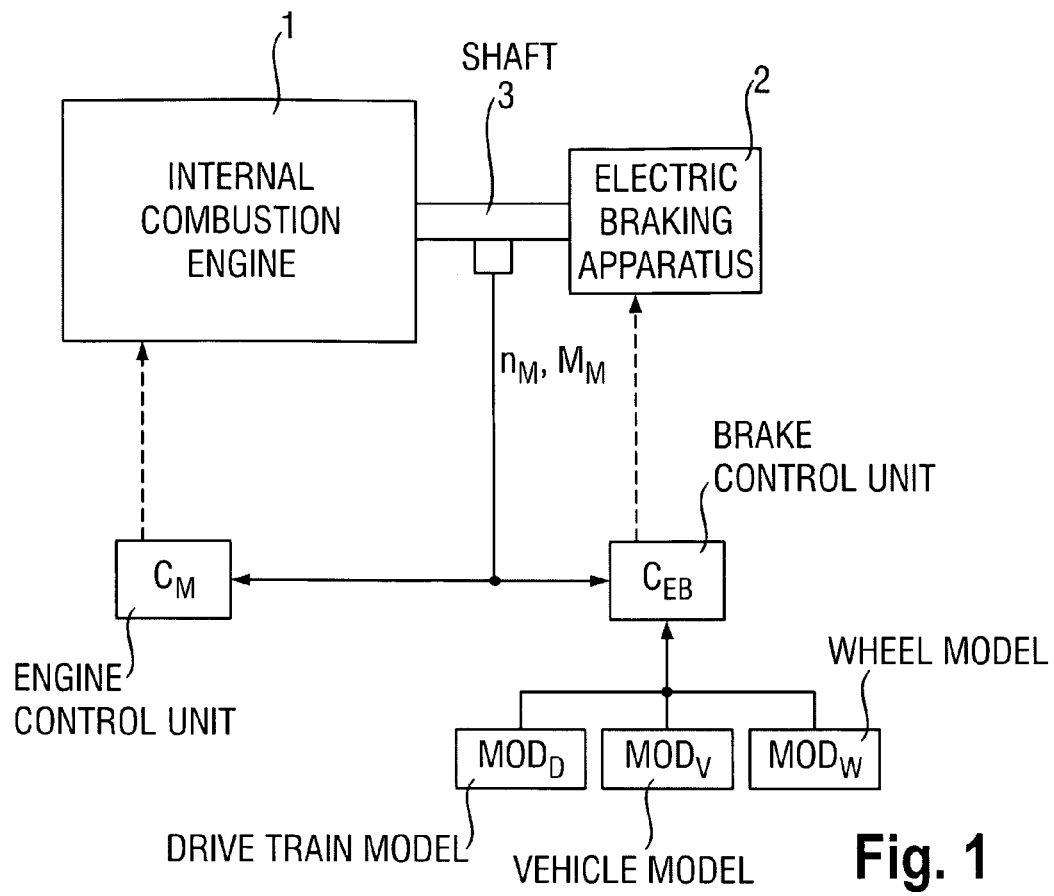
FIG. 1 shows the general arrangement of a test stand.

FIG. 1 shows the typical arrangement of a test stand in which an internal combustion engine 1 is connected with an electric braking apparatus 2 via a shaft 3. The following can be measured on the shaft:

$M_M$ Motor torque on the driven engine shaft
$n_M$ Speed of the engine on the driven shaft It is understood that the angular acceleration is also used for the calculations. Since the same is obtained directly from the temporal differentiation of the angular speed which is proportional to the rotational speed, this shall not be separately mentioned below.

The internal combustion engine 1 is controlled by an engine control unit $C_M$ and the electric brake 2 is controlled by a brake control unit $C_{EB}$. In the brake control unit $C_{EB}$ the drive train model $MOD_D$, the vehicle model $MOD_V$ and the wheel model $MOD_W$ are linked in a suitable manner.

Figure 2:
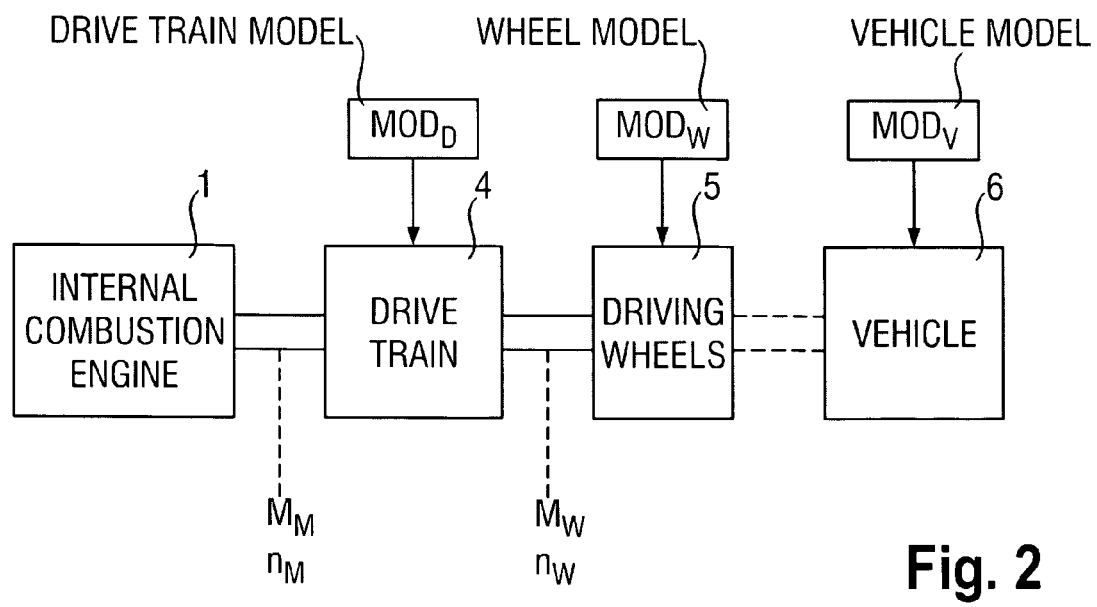
FIG. 2 shows the relevant parts of a vehicle to be simulated in the form of a block diagram which is also based on the models used.

FIG. 2 shows the relevant components of a vehicle to be simulated in the form of a block diagram. The internal combustion engine 1 drives the driving wheels 5 via a drive train 4, which driving wheels influence the behavior of the vehicle 6 via the contact with the vehicle surface. In addition to the aforementioned motor torque $M_M$ and the engine speed $N_M$, the following variables are relevant.

$M_W$ ... driving wheel torque
$n_W$ ... driving wheel speed
$v_V$ ... vehicle speed In the drive train model $MOD_D$ the variables $M_W$, $n_W$, $M_M$, $n_M$ are linked by a function $F_1$. The function $F_1$ includes parameters which reflect the masses, elasticities and dampings of the drive train and the gear transmission of the respective gear.

The vehicle model $MOD_V$ determines the torque $M_W$ acting on the driving wheel as a function of the vehicle speed and the slip.

The vehicle model $MOD_V$ substantially reflects the behavior of the vehicle due to air resistance, rolling resistance and inertia of the vehicle during speed changes.

The drive model $MOD_W$ is used for calculating the slip, with the function $F_3$ primarily including the vehicle speed $v_V$ and the driving wheel torque $M_W$. In real models, additional parameters and variables can be used in order to increase the precision accordingly. The slip on the driving wheels therefore depends essentially on the tire temperature for example, which temperature on its part is a consequence of the slip at earlier times.

In a first embodiment of the invention the equation (3) for the calculation of the vehicle speed from the angular speed $\omega_W$ of the driving wheel is used in the vehicle model $MOD_V$, which speed neglects the slip.

$$v_V^* = U_W \cdot n_W \qquad (3)$$

$v_V^*$ represents a virtual (i.e. intentionally falsified) vehicle speed. For the engine control $C_M$, the vehicle speed v is calculated correctly by taking the slip S according to equation (4) into account.

$$v_V = (1-S) \cdot U_W \cdot n_W \qquad (4)$$

It was noticed surprisingly that in this way the oscillations of the system by the sip control can be reflected in a highly favorable approximation. The relevant aspect is that in particular the oscillation frequencies correspond substantially to the oscillation frequencies occurring in reality when a suitable choice of all parameters is made. Merely the oscillation amplitudes are under certain circumstances slightly smaller than in the real vehicle. As in the simplified model of the state of the art, the vehicle speed is not reflected in a completely correct way, thus leading to slight errors. This can be compensated to a substantial extent by suitable adaptation of the parameters in the course of a calibration of the model.

In a generalized form the virtual vehicle speed $v_V^*$ can be represented in the following form:

$$v_V^* = v_V \cdot k \quad (5)$$

The corrective value can be chosen $k=(1-S)$ or in another suitable form as a function of slip S.

In a further embodiment of the invention the errors occurring by the partial neglect of the slip can be excluded to a substantial extent. The equation (6) is used for the calculation of the vehicle speed $v_V$ in the vehicle model $MOD_V$.

$$v_V^* = (1-S_{int}) \cdot U_W \cdot n_W \quad (6)$$

Instead of the current slip S, a value $S_{int}$ is used which is obtained by integrating the values of slip S over a certain period of time. For the vehicle model a value is used for the slip which is smoothed and therefore does not make the test stand oscillate, which oscillations are caused by the mass of the electric brakes and do not exist in reality. An equation (4) as above is used for the engine control $C_M$.

The present invention also allows reflecting transient phenomena such as high-frequency fluctuations in the wheel speed which are caused by slip control programs on a test stand which is not sufficiently dynamic to actually follow such oscillations.

What is claimed is:

1. A method for simulating driving behavior of a vehicle having driving wheels on a test stand comprising the following steps:
    a) positioning the vehicle on the test stand;
    b) coupling an engine of the vehicle on the test stand to an electronically controllable braking apparatus;
    c) calculating a series of simulation values of variables by a simulation model, which values are representative of a driving state of the vehicle considering a reaction of the vehicle to a behavior of the engine and further considering values of the variables as determined in an immediately prior calculation,
    d) calculating a first vehicle speed representing a vehicle speed considering slip of the tires of the driving wheels;
    e) calculating a virtual vehicle speed derived from the first vehicle speed corrected by a factor k being a function of the slip of the tires of the driving wheels;
    f) controlling the engine of the vehicle on the test stand by using the first vehicle speed; and
    g) controlling the electronically controllable braking apparatus by using the virtual vehicle speed.

2. The method according to claim 1, wherein factor K depends primarily on short-term fluctuations of the slip.

3. The method according to claim 1, including a step of calculating a speed of non-driven wheels of the vehicle using the simulation model.

4. The method according to claim 1, including a step of determining lateral slip of the driving wheels.

* * * * *